United States Patent Office 3,250,752
Patented May 10, 1966

3,250,752
PROCESS OF REACTING KETENE WITH A POLYMER FORMED FROM AN UNSATURATED MONOCARBOXYLIC ACID
Henry A. Walter, Longmeadow, Mass., assignor to Monsanto Company, a corporation of Delaware
No Drawing. Filed Dec. 30, 1960, Ser. No. 79,566
8 Claims. (Cl. 260—80)

The present application is directed to synthetic polymers and more particularly to synthetic polymers containing pendant anhydride groups.

Efforts are continually being extended to obtain synthetic polymers and particularly addition-type synthetic polymers, exhibiting improvements in high temperature performance. This would include improved resistance to distortion, deterioration, etc., with exposure to increased temperature. In this regard, very few of the addition-type synthetic polymers presently known can be expected to withstand temperatures on the order of 150° C., or greater, without becoming distorted, deteriorating or otherwise adversely affected.

Accordingly, it is a principal object of this invention to provide synthetic polymers exhibiting high temperature properties, for example high heat distortion.

Another object of this invention is to provide a process by which to produce the above polymers.

These and other objects of the present invention can be obtained in polymers containing pendant anhydride functional groups, as are derived by a process involving the steps of (A) reacting a polymer containing monocarboxlyic acid recurring units having the structure:

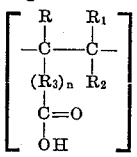

wherein R, $R_1$ and $R_2$ are selected from the class consisting of alkyl, aryl, halogen and hydrogen radicals, $R_3$ is selected from the class consisting of alkylene radicals, and $n$ is an integer representing 0–18 carbon atoms with a ketene having the structure:

wherein $R_4$ is selected from the class consisting of alkyl, aryl and hydrogen radicals, thereby converting the said acid units of the said polymer monocarboxylic to complexed acid-anhydride units having the structure:

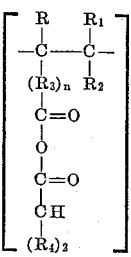

and then (B) heating the said monocarboxylic complexed acid-anhydride unit containing intermediate polymer to produce a polymer containing pendant anhydride functional groups in which unit pairs are joined by ring closure in the following manner:

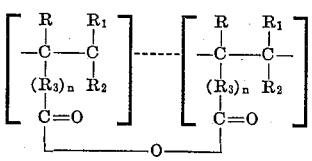

The following examples are given in illustration of the invention. Where parts are mentioned, parts by weight are intended unless otherwise indicated.

Example I

One part of polyacrylic acid is dispersed in ten parts of acetic anhydride. Ketene is passed into the dispersion at the rate of 0.4 to 0.5 moles/hour until the polyacrylic acid becomes dissolved in the anhydride. The solution formed is determined to be the polyacrylic acid-acetic anhydride complex. On removal of the acetic anhydride solvent by distillation at 140° C. a sudden precipitation of resinous mass takes place.

A portion of the resinous mass is heated at 180° C. between pressed plates to form into a clear, colorless, continuous film which fuses, with evolution of acetic anhydride, when exposed to 230° C. at atmospheric pressure for a period of 3 minutes. Infrared spectrum analysis indicates that the fused film is polyacrylic anhydride. The glassy transition temperature $T_{(g)}$ of the polyacrylic anhydride is determined to be 186° C. compared to a $T_{(g)}$ for the polyacrylic acid starting material of 106° C.

Samples of each of the polyacrylic acid starting material and the polyacrylic anhydride obtained above are tested for thermal decomposition using a Thermograph. In essence this apparatus involves the use of a vacuum program oven in which the weight loss of samples can be observed while the temperature of the oven is being raised at a constant rate. Weight loss v. temperature are recorded. When a weight loss of 2% is observed, this is taken as the point at which significant thermal decomposition takes place. By this procedure polyacrylic acid evidences thermal decomposition at about 260° C., while by comparison the polyacrylic anhydride produced above does not evidence the same decomposition until a temperature of about 406° C. is arrived at.

Example II

Twenty grams of polymethacrylic acid is dispersed in 200 ml. of acetone. Ketene is passed through the dispersion for about 4 hours at the rate of 10.5 grams/hour, after which the mass dissovles in the acetone, forming a clear, viscous syrup.

Films having a thickness of 0.003 inch, before drying, are cast from the syrup onto glass plates. The films are clear and after drying for two hours under a temperature of 40–50° C., can be stripped from the plates. If left standing at room temperature continuous films form after about 10 hours. Using I. R. spectrum analysis, the films are determined as containing polymethacrylic acid anhydride complexed units. The films do not fuse at temperatures up to 230° C. Rather, they remain clear to 160° C. and lose acetic anhydride and develop into an infusible film at about 245° C.

Example III

Thirty grams of polyoleic acid (partially dimers and trimers) is mulled into 200 ml. of methyl ethyl ketone and 42.1 grams of ketene is passed through the dispersion over a period of 4.5 hours during which time the dispersion gradually changes to a clear, amber liquid, indicating that the complexed intermediate product is being formed.

The amber viscous liquid which results from the ketene reaction is cast as a thin film onto a glass plate and placed under a vacuum of 22 mm. Hg and room temperature for a period of 4 hours to remove residual methyl ethyl ketone solvent, and, form a continuous film.

The film is then exposed to a temperature of 270° C. for a period of 10 minutes driving off acetic anhydride and allowing the intermediate complexed product to become converted to the crystallized anhydride counterpart. As a result, the film becomes fused into a clear, tough film which resists distortion at temperatures well above the fusion temperature for the same.

Example IV

A stream of freshly generated ketene is bubbled into a dispersion of 106.5 grams of poly alpha(chloro)acrylic acid in 500 ml. of acetone. After about 4 hours, when about 53 grams of ketene has been introduced, a viscous solution of poly alpha(chloro)acrylic acid-acetic anhydride complex results.

The intermediate complexed product is spread onto a plate of polished steel using a doctor blade. After removal of the residual acetone solvent by allowing the plate to stand at room temperature for a period of 24 hours a continuous self-supporting film is obtained which can be lifted off the plate. The film is then cut into small pieces and is fused in a molding press at 240° C. and 1800 p.s.i. pressure.

The fused film which results is subjected to I. R. Spectrum analysis and the presence of anhydride crystallization is noted.

Example V

A solution of 56 grams of freshly prepared methyl ketene in 250 cc. of diethyl ether, is dropped into a stirred dispersion of 72 grams of polyacrylic acid in 300 cc. of acetone. The mixture is warmed to a temperature of about 45° C. allowing the ether to be removed from the reaction mixture. After an additional amount of about 10 g. of methyl ketene has been added to the reaction mixture, heating is continued until the resulting dispersion becomes a clear solution.

Films are cast from the reaction mixture and allowed to dry in a circulating air oven at 80° C. for a period of 20 minutes to drive off acetone. The films at this point are continuous in nature but are not fused. The temperature of the oven is raised to 280° C. and the films allowed to remain for a period of 60 minutes. When removed the films have become fused.

When exposed to temperatures in excess of 300° C. the films, which can be established as containing cyclized pendant anhydride groups by I. R. Spectrum analysis, resist thermal distortion.

Example VI

A solution of 100 grams diphenyl ketene in 100 cc. of cyclohexanone is added dropwise under an atmosphere of carbon dioxide to a dispersion of 42 grams of polymethacrylic acid, in 250 cc. of cyclohexanone. The dispersion is stirred and heated to about 100–120° C. The color of the red-yellow diphenyl ketene changes perceptively on reaction and a lighter colored resin solution is obtained after all the diphenyl ketene has been added.

The boiling point of the diphenyl acetic anhydride is above 300° C., therefore, removal of the same is carried out in a vacuum of 15 mm. with heating above 220° C. in the second step following removal of cyclohexanone solvent and formation into films. This is designed to break down the acid-anhydride complex to obtain a film in which final polymer product contains pendant cyclized anhydride functionability.

The films resulting from the second step are subjected to I. R. spectrum analysis to establish the presence of anhydride repeating units. When exposed to a temperature of 325° C. the films exhibit resistance to distortion due to this high temperature.

The functional anhydride polymers to which the present invention is directed are those which are produced by a process comprising the steps of (A) reacting a polymer comprising monocarboxylic acid recurring units which can be represented as:

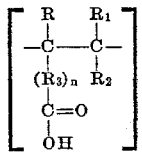

wherein R, $R_1$ and $R_2$ are selected from the class consisting of alkyl, aryl, halogen and hydrogen radicals and $R_3$ is selected from the class consisting of alkylene radicals, and $n$ is an integer representing 0–18 carbon atoms, with a ketene which can be represented as:

$$(R_4-)_2C=C=O$$

wherein $R_4$ is selected from the class consisting of alkyl, aryl and hydrogen radicals to convert the said acid units to monocarboxylic acid-anhydride complex units which can be represented as:

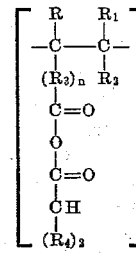

and then (B) heating the said monocarboxylic acid-anhydride complex unit containing intermediate polymer to produce the polymeric acid-anhydride containing recurring unit pairs joined by ring closure in the manner which can be represented as:

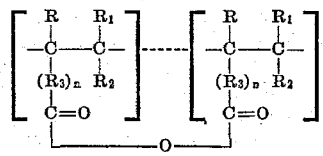

The polymeric acids which can be used as starting materials in practice of the present invention include those containing monocarboxylic acid recurring units. The polymeric acids can result from addition-type polymerization, and, accordingly, contain pendant or functional carbonyl groups. These relate back to and can be obtained by polymerizing by addition polymerization techniques, monocarboxylic acids containing unsaturation. The initial monocarboxylic acids are preferably the olefin acids, exemplified by acrylic acid; butenic acids, such as crotonic acid, isocrotonic acid, vinyl acetic acid, and methacrylic acid; pentenic acids such as tiglic acid, angelic acid and senecioic acid; also hexenic acids, teracylic acid, hypogeic acid, oleic acid, eludic acid, erucic acid, brassidic acid, behinic acid, etc. and mixtures of the same. In polymerized form these monocarboxylic acids form units which can be represented by the formula:

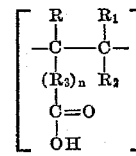

wherein R, $R_1$ and $R_2$ are selected from the class consisting of alkyl, aryl, halogen and hydrogen radicals, $R_3$ is selected from the class consisting of alkylene radicals and $n$ is an integer of from 0–18 carbon atoms. In addition to the monocarboxylic acids, the polymeric starting materials can also include other structural units as can be provided by interpolymerization with vinyl and vinylidene compounds such as maleic acid, styrene, alpha methyl styrene, vinyl chloride, vinyl acetate, vinyl propionate, vinyl benzoate, ethylene, propylene, butadiene, isoprene, durene, etc.

The polymeric monocarboxylic acids may also be obtained by saponification or hydrolysis of the corresponding polymer esters, amides or nitriles, e.g., methyl acrylate, methylmethacrylate, etc. acrylonitriles or methacrylonitriles. Reflecting back, polymerization of the unsaturated acid derivatives to provide the polymeric starting materials can be attained by suspension, emulsion or mass-type addition procedures using a homogeneous catalytic system. Catalysts which can be used for this purpose include peroxides, bis-azo-dinitriles, etc. While the polymeric acids can be constituted of monocarboxylic acids in which $n=$ an integer of 0–18, those in which $n$ equals an integer of 0 or 1, or, from 5 to 15 are preferred in that they contribute a pendant cyclic anhydride on the final product which is connected through 6 or 8 and 16 to 32 member rings, respectively. Rings having between 10 and 14 members are much more difficult in this formation.

The ketenes which are reacted with the polymeric monocarboxylic acid are those having the formula:

wherein $R_4$ is selected from the class consisting of alkyl, aryl and hydrogen radicals. Examples of the ketenes are prototype ketene, methyl ketene, ethyl ketene, methyl ethyl ketene, phenyl ketene, diphenyl ketene, methyl phenyl ketene, etc., and mixtures of the same. Both the aldo ketenes and keto ketenes can be used to practice in the present invention. The preferred ketene is ketene itself. The substituted ketenes, both the mono substituted or aldo ketenes and the disubstituted or keto ketenes, while they can be used to advantage can be expected to add complexity to the process aspects of the invention and particularly to the first step or stage reaction of the same.

The process of the present invention constitutes a two-stage process. In the first stage, the monocarboxylic acid polymer is reacted with a ketene to produce the monocarboxylic acid-anhydride complex polymer. The recurring units of this latter polymer can be represented by the formula:

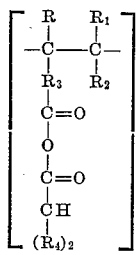

wherein $R$, $R_1$ and $R_2$ are selected from the class consisting of alkyl, aryl, halogen and hydrogen radicals, $R_3$ is selected from the class consisting of alkylene radicals, $R_4$ is selected from the class consisting of alkyl, aryl and hydrogen radicals and $n$ is an integer representing 0–18 carbon atoms. The reaction can be carried out in various media, however, that preferred, constitutes an organic liquid containing no available hydroxyl radicals. Examples of organic liquids useful as reaction media include ethers such as diethyl ether, tetrahydrofuran, dioxane and dimethoxyethane etc., ketones, acetone, methyl ethyl ketone, acetophenone and acid-anhydrides such as acetic anhydride, propionic anhydride, etc. and mixtures of the same. The reaction media should be maintained anhydrous in nature.

Variations can be practiced in the temperature and pressure conditions under which the first stage reaction is carried out. When ordinary pressure is used, the temperature is preferably maintained below about the boiling point of the corresponding acid-anhydride derivative of the ketene reactant used. With variations in the pressure, the temperature is accordingly compensated for.

Indications that the first step or stage reaction has proceeded to the point where the intermediate complexed product has been formed are generally manifest by the reaction mass becoming soluble in the reaction media. Solvation may be complete or it may be partially so as indicated by the reaction mass becoming swollen. At this point, the intermediate product, to wit: the polymeric acid-anhydride complex can be isolated from the solvent media by mild evaporation of the solvent. In exceptional instances, where the organic liquid constituting the reaction media has a boiling point higher than that of the acidic anhydride to be removed, the intermediate product may be retained in the reaction media and the second-step initiated. An instance of the latter situation can involve the use of acetophenone as the reaction media together with the presence of acetic anhydride as the removable acidic anhydride.

The second step or stage reaction involves the conversion of the acid-anhydride complexed polymer or intermediate product to the final anhydride polymer product. Where the intermediate product resulting from the first stage has been isolated, the second stage reaction can be carried out in any number of convenient locations. The second stage reaction involves simply, driving off from the intermediate product the complexed acidic anhydride moiety by use of heat or pressure, actually reduced pressure, the combination of these conditions being assessable relative to the vapor pressure of the acidic-anhydride derivative of the ketene initially used to obtain the desired polymeric product containing pendant anhydride recurring unit pairs joined by ring closure in the manner which can be represented by the formula:

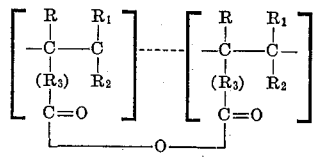

wherein $R$, $R_1$ and $R_2$ are selected from the class consisting of alkyl, aryl, halogen and hydrogen radicals, $R_3$ is selected from the class consisting of alkyene radicals and $n$ is an integer representing 0–18 carbon atoms. Using ordinary pressure, a temperature higher than the boiling point of the acidic anhydride to be removed, can be used in carrying out the second stage reaction.

Because of the simplicity of conditions under which the second stage reaction can be carried out, the intermediate product can be cast or otherwise formed into a film, coating, casting or other desired shape and the second stage carried out accordingly, and in situ.

The polymeric anhydrides produced in accordance with the present invention then have utility as fibers, films and cast shapes evidencing resistance to distortion, deterioration and other attack from relatively high temperatures. Their unusual high heat stability is far in excess of that evidenced by their acid polymer counterparts.

Additionally, the polymeric anhydrides presently featured can be used in sole to form films, fibers and shapes or they can be used in conjunction with various other synthetic polymeric materials such as alkyd resins, etherified melamine- or urea-formaldehyde resins, epoxy resins, etc., if desired.

It will thus be seen that the objects set forth above, among those made apparent from the preceding description are efficiently attained and, since certain changes may be made in carrying out the above method and in the composition set forth without departing from the scope of the invention, it is intended that all matter contained in the above description shall be interpreted as illustrative and not in a limiting sense.

What is claimed is:

1. A process for producing a synthetic polymeric containing anhydride pendant groups which comprises the steps of (A) reacting a polymer containing monocarboxylic acid recurring units having the structure:

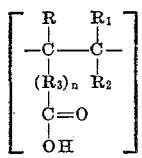

wherein R is selected from the class consisting of hydrogen, methyl and chlorine, $R_1$ is hydrogen, $R_2$ is selected from the class consisting of hydrogen and 1 to 8 carbon atom alkyls, $R_3$ is methylene, and $n$ is an integer representing 0–7 carbon atoms with a ketene having the structure:

$$(R_4-)_2C=C=O$$

wherein $R_4$ is selected from the class consisting of hydrogen, methyl and phenyl to convert the said acid units to monocarboxylic complexed acid-anhydride units having the structure:

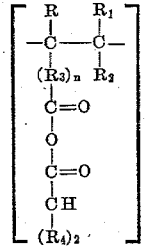

and then (B) heating the said mixed monocarboxylic acid-anhydride unit containing polymer to produce the polymeric acid-anhydride containing recurring unit pairs joined by ring closure in the manner represented as:

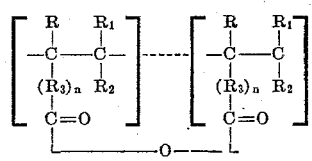

2. The process according to claim 1 wherein the polymeric monocarboxylic acid is polyacrylic acid.
3. The process according to claim 1 wherein the polymeric monocarboxylic acid is polymethacrylic acid.
4. The process according to claim 1 wherein the polymeric monocarboxylic acid is polyoleic acid.
5. The process according to claim 1 wherein the polymeric monocarboxylic acid is poly alpha(chloro)acrylic acid.
6. The process according to claim 1 wherein the ketene is ketene.
7. The process according to claim 1 wherein the ketene is methyl ketene.
8. The process according to claim 1 wherein the ketene is diphenyl ketene.

References Cited by the Examiner

UNITED STATES PATENTS

| | | | |
|---|---|---|---|
| 2,430,479 | 11/1947 | Pratt et al. | 154—140 |
| 2,465,337 | 3/1949 | Miller et al. | 260—585.5 |
| 2,988,541 | 6/1961 | Semon et al. | 260—80 |
| 3,005,785 | 10/1961 | Jones et al. | 260—2.1 |

FOREIGN PATENTS

| | | |
|---|---|---|
| 887,123 | 7/1953 | Germany. |
| 940,680 | 3/1956 | Germany. |

JOSEPH L. SCHOFER, *Primary Examiner.*

HAROLD BURSTEIN, LEON J. BERCOVITZ,
*Examiners.*